UNITED STATES PATENT OFFICE.

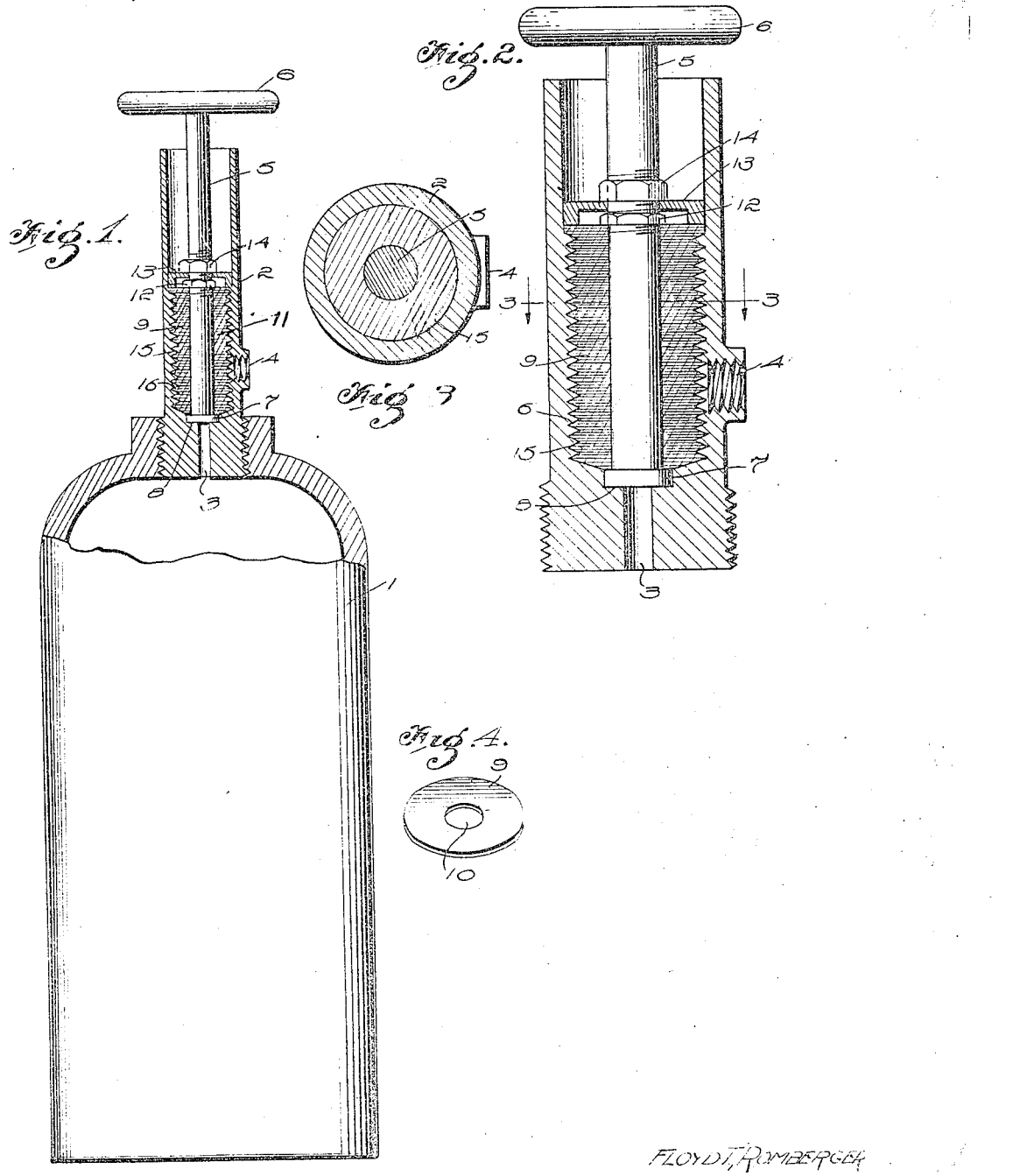

FLOYD TROUTMAN ROMBERGER, OF WEST LAFAYETTE, INDIANA.

VALVE.

1,401,923.

Specification of Letters Patent.   Patented Dec. 27, 1921.

Application filed July 8, 1920.   Serial No. 394,663.

*To all whom it may concern:*

Be it known that I, FLOYD T. ROMBERGER, a citizen of the United States, residing at West Lafayette, in the county of Tippecanoe and State of Indiana, have invented certain new and useful Improvements in Valves, of which the following is a specification.

This invention relates to valves, and it comprises a valve casing having inlet and outlet openings, a valve stem arranged in the casing and a plurality of disks of thin material arranged on the valve stem to produce a laminated valve body or plug, the valve body being adapted to fit snugly within the valve casing to prevent leakage.

In the present invention, I have produced a valve that is particularly adapted for use in connection with tanks or receptacles containing compressed gases or liquids under high pressure, and also to control the flow of gases, steam or liquids whether in tanks, pipes or other receptacles. The ordinary type of valve employing flexible packing of the usual nature has proved very unsatisfactory in this class of work. In recent years, the use of various gases for different purposes, such as the use of nitrous oxid and oxygen as anesthetic, has led to the distribution and storage of such gases in steel tanks or cylinders, the cylinders being made of various sizes and the gas being placed therein under very heavy pressure. It has been found that the ordinary type of valve employing a packing of fabric or similar material is not leak proof when very heavy pressure, such as a pressure from 1200 to 1500 pounds to the square inch, is employed.

In the present invention, I have produced a valve comprising a casing and a valve stem having a plurality of disks or sheets of very thin material arranged thereon to produce a laminated valve plug. The disks are assembled on the valve stem and secured in position by means of suitable retaining means. After the valve has been assembled, each of the disks maintains a certain amount of flexibility, giving, in effect, as many distinct bearing surfaces as there are disks employed.

In the accompanying drawings,

Figure 1 is a side elevation of a gas tank with a valve applied showing the valve in section.

Fig. 2 is an enlarged sectional view of the valve.

Fig. 3 is a horizontal sectional view taken on the line 3—3 of Fig. 2.

Fig. 4 is a detail view of one of the disks employed in constructing the valve.

Referring to the drawings, the reference numeral 1 designates generally a tank or cylinder in which gas under pressure is stored. The cylinder is provided with a threaded opening at a suitable point adapted to receive the threaded end of the valve casing 2. The valve casing is provided with an opening 3 communicating with the interior of the cylinder and an outlet 4 arranged at a suitable point. Communication between the port 3 and the outlet 4 is controlled by a suitable valve plug or body arranged within the valve casing.

As shown, a valve stem 5 is arranged in the casing and is provided with an operating handle 6. The lower end of the valve stem may be provided with a head 7 of hard rubber, vulcanite, or similar composition, and this head is adapted to engage a seat 8 formed in the valve casing. Arranged above the head is a plurality of disks or sheets of suitable material 9, (see Fig. 4) forming the valve body. Each of these disks is provided with a central opening 10 for the passage of the valve stem. Any suitable material may be used in constructing the valve body. Sheets of steel, bronze, brass, fiber, or other material may be advantageously employed. The disks are made of very thin material and assembled on the valve stem to form valve body 11. A nut 12 is arranged below the retaining collar 13 and held in position by nut 14. The pressure on the disks may be adjusted by the retaining collar and nut. The valve body is provided with external screw threads 15 adapted to engage internal threads 16 formed in the valve casing.

In the operation of the valve, the valve is operated in the usual manner by turning the hand wheel 6 arranged on the valve stem. Through the engagement of the screw threads 15 and 16, the valve body is raised in the valve casing permitting communication between the port 3 and outlet 4.

I have found that a valve of this type requires no packing and is positively leak proof under all conditions and under excessive pressure. The individual sheets of laminating material forming the valve body retain a certain amount of flexibility after assemblage and present a narrow bearing surface against the inner face of the valve casing giving as many distinct bearing surfaces as there are disks employed in the formation of the valve body. By means of the adjusting nut and retaining collar, the pressure exerted at the periphery of the disks may be adjusted and wear may be taken up by tightening the retaining collar on the stem.

It is to be understood that, while I have described the preferred embodiment of my invention, various changes in the shape, size, and arrangement of parts may be resorted to without departing from the spirit of the invention or the scope of the subjoined claims.

Having thus described my invention, I claim:

1. A valve comprising a valve casing, a valve stem arranged therein, a plurality of sheets of laminated material arranged on said valve stem and forming the valve body, the interior of the valve casing being provided with screw threads, and the valve body being provided with screw threads engaging the screw threads of the valve casing, and means for adjusting the pressure on said sheets of laminated material.

2. A valve comprising a valve casing, a valve stem arranged therein, a plurality of sheets of laminated material arranged on said valve stem and forming the valve body, said valve body fitting snugly within the casing, and means for adjusting the pressure on said sheets of laminated material.

3. A valve comprising a valve casing, a valve stem arranged therein, a plurality of sheets of laminated material arranged on said valve stem and forming the valve body, said valve body fitting snugly within the casing, a nut arranged on the valve stem above said valve body, and a retaining collar arranged on the valve stem and engaging said valve body.

4. A valve comprising an internally threaded casing, a valve body arranged therein, said valve body being formed of sheets of laminated material, and provided with threads engaging the threads of the casing, a valve stem secured to said valve body, and means for adjusting the pressure on said sheets of laminated material.

In testimony whereof I affix my signature in presence of two witnesses.

FLOYD TROUTMAN ROMBERGER, M. D.

Witnesses:
LAURA E. ROMBERGER,
E. K. WARREN.